US009154732B2

(12) United States Patent
Guleryuz et al.

(10) Patent No.: US 9,154,732 B2
(45) Date of Patent: Oct. 6, 2015

(54) VISUAL CONDITIONING FOR AUGMENTED-REALITY-ASSISTED VIDEO CONFERENCING

(71) Applicant: Futurewei Technologies, Inc., Plano, TX (US)

(72) Inventors: Onur G. Guleryuz, San Francisco, CA (US); Antonius Kalker, Mountain View, CA (US)

(73) Assignee: Futurewei Technologies, Inc., Plano, TX (US)

(*) Notice: Subject to any disclaimer, the term of this patent is extended or adjusted under 35 U.S.C. 154(b) by 189 days.

(21) Appl. No.: 13/732,123

(22) Filed: Dec. 31, 2012

(65) Prior Publication Data

US 2013/0265382 A1   Oct. 10, 2013

Related U.S. Application Data

(60) Provisional application No. 61/621,612, filed on Apr. 9, 2012.

(51) Int. Cl.
*H04N 7/15* (2006.01)
*G06T 11/60* (2006.01)

(52) U.S. Cl.
CPC . *H04N 7/15* (2013.01); *G06T 11/60* (2013.01)

(58) Field of Classification Search
CPC .................................................... G06K 9/0026
USPC ................................ 348/14.08; 382/118, 284
See application file for complete search history.

(56) References Cited

U.S. PATENT DOCUMENTS

| 7,227,567 B1* | 6/2007 | Beck et al. ................ 348/14.07 |
| 7,834,894 B2* | 11/2010 | Swanson et al. ............. 345/634 |
| 2010/0150406 A1* | 6/2010 | Xiao et al. .................... 382/118 |

FOREIGN PATENT DOCUMENTS

| EP | 1626371 A1 | 2/2006 |
| WO | 2006127177 A1 | 11/2006 |

OTHER PUBLICATIONS

Guleryuz, O., et al., "Visual Conditioning for Augmented-Reality-Assisted Video Conferencing," 2012 IEEE 14th International Workshop on Multimedia Signal Processing (MMSP), Sep. 1, 2012, pp. 71-76.
Tang, Z., et al., "Image Composition with Color Harmonization," 2010 25th International Conference of Image and Vision Computing New Zealand (IVCNZ), Nov. 8, 2010, 8 pages.
Foreign Communication From a Counterpart Application, PCT Application PCT/US2013/035656, Invitation to Pay Additional Fees dated Jun. 11, 2013, 7 pages.
Piccardi, Massimo, "Background subtraction techniques: a review", IEEE Conference on Systems, Man and Cybernetics, Oct. 2004, pp. 3099-3104.

(Continued)

*Primary Examiner* — Amal Zenati
(74) *Attorney, Agent, or Firm* — Conley Rose, P.C.; Grant Rodolph; Brandt D. Howell

(57) ABSTRACT

An apparatus comprising a processor configured to receive a video teleconferencing image, wherein the video teleconferencing image has a background and at least one foreground, wherein the foreground has a boundary, determine the boundary of the foreground, overlay the boundary of the foreground with a drawing area, wherein the drawing area obscures the boundary, and replace the background of the image with a new background.

20 Claims, 8 Drawing Sheets

(56) References Cited

OTHER PUBLICATIONS

Sinop, Ali Kemal, et al., "A Seeded Image Segmentation Framework Unifying Graph Cuts and Random Walker Which Yields a New Algorithm", Proc. of ICCV, Rio de Janiero, Brazil, Oct. 2007, 8 pages.

Cousty, Jean, et al., "Watershed Cuts: Thinnings, Shortest Path Forests, and Topological Watersheds", IEEE Transactions on Pattern Analysis and Machine Intelligence, vol. 32, No. 5, May 2010, pp. 925-939.

Tokumaru, Masataka, et al., "Color Design Support System Considering Color Harmony", Fuzzy Systems 2002, Fuzz-IEEE'02, Proceedings of the 2002 IEEE International Conference, May 2002, pp. 378-383.

Cohen-Or, Daniel, et al., "Color Harmonization", ACM Transactions on Graphics, vol. 25, No. 3; 2006, pp. 624-630.

Foreign Communication From a Counterpart Application, PCT Application No. PCT/US2013/035656, International Search Report dated Dec. 16, 2013, 7 pages.

Foreign Communication From a Counterpart Application, PCT Application No. PCT/US2013/035656, Written Opinion dated Dec. 16, 2013, 9 pages.

* cited by examiner

VISUAL CONDITIONING FOR AUGMENTED-REALITY-ASSISTED VIDEO CONFERENCING

CROSS-REFERENCE TO RELATED APPLICATIONS

This application claims priority to U.S. Provisional Application No. 61/621,612, filed Apr. 9, 2012 by Onur G. Guleryuz et al. titled "Visual Conditioning for Augmented-Reality-Assisted Video Conferencing," which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Telepresence, e.g., video conferencing involving multiple users at remote locations, is becoming increasingly popular. In telepresence applications, a video object may refer to an area of interest in a video frame that comprises a foreground, e.g., a human subject, and a background, e.g., a surrounding environment. Multiple video objects from different sources may be transmitted to a common location in a telepresence system, where they may be received, processed and displayed together with each video object in its individual background. Unless telepresence rooms or other artificial environments are utilized, conferences involving many individuals result in a cacophony of visuals and backgrounds. Such backgrounds can be distracting and/or disorienting to video conferencing participants and may detract from the immersive video conferencing experience. While a need exists to visually separate or segment human subjects from their respective surrounding environments, available techniques for image/video segmentation may result in generally unacceptable video conference rendering quality.

SUMMARY

In one aspect, the disclosure includes an apparatus comprising a processor configured to receive a video teleconferencing image, wherein the video teleconferencing image has a background and at least one foreground, wherein the foreground has a boundary, determine the boundary of the foreground, overlay the boundary of the foreground with a drawing area, wherein the drawing area obscures the boundary, and replace the background of the image with a new background.

In another aspect, the disclosure includes a computer program product comprising computer executable instructions stored on a non-transitory medium that when executed by a processor cause the processor to perform the following: receive a video conferencing image, wherein the image has a foreground and a background, select at least one dominant foreground color, identify a new background, wherein the new background has at least one dominant background color matching the dominant foreground color, and replace the background with the new background.

In yet another aspect, the disclosure includes a method for visual conditioning for augmented-reality-assisted video conferencing, comprising separating a video conferencing image into a foreground and a first background, wherein separation results in a foreground having at least one segmentation, deriving a drawing area around the segmentation, designing one or more textures to be rendered in the drawing area, selecting a second background, and combining the foreground, the one or more textures, the drawing area, and the second background to form a composite image.

These and other features will be more clearly understood from the following detailed description taken in conjunction with the accompanying drawings and claims.

BRIEF DESCRIPTION OF DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
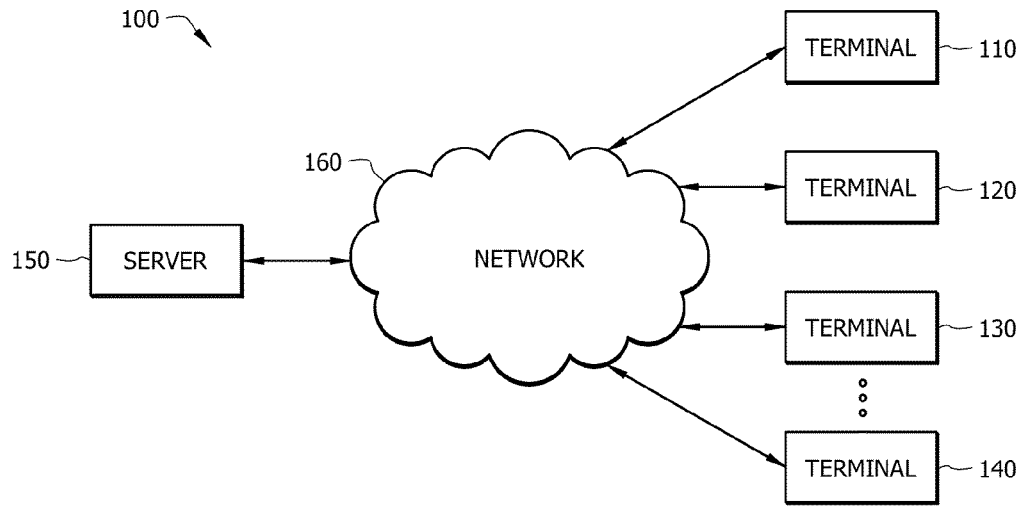
FIG. 1 is a schematic diagram of an embodiment of a general telepresence architecture.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

This disclosure includes a system and method for allowing simpler devices with lowered computational complexity and energy requirements to accomplish visually pleasing visual conditioning for augmented-reality assisted video conferencing. Operating at the rendering step, either at display or at servers when Multipoint Control Units (MCUs) are utilized, the disclosed systems and methods may utilize the basic properties of the human visual system to hide segmentation artifacts. Specifically, visually pleasing virtual backgrounds having directional textures that hide segmentation artifacts due to noisy boundaries, missing regions, etc., may be selected to match and highlight participant visuals characteristics. The disclosed systems and methods may accomplish this including utilizing, inter alia, simple computations and lookup tables. The disclosed approaches may be based on drawing and color picking principles established in art and graphic design. The designed directional textures may be motivated by the "contour hatching" drawing technique and the designed backgrounds by the "crosshatching" shading technique as well as "harmonic" colors.

Some attempts at image segmentation may use background subtraction. Whenever the foreground (e.g., the participant) and background depictions are sufficiently distinct, the correct segmentation of the foreground may be approximately inferred. Background subtraction techniques may be amenable to fast, low complexity implementations on mobile devices. Yet, even under chroma-keying scenarios using distinct backgrounds, segmentation errors may be susceptible to mistakes particularly visible at segment boundaries.

Segmentation may also use depth sensors. Depth sensors can compute the distance of points in the scene to the imaging plane and augment the recorded color information at every pixel. While color-only segmentation rarely produces adequate results, with depth information, substantially improved segmentation becomes possible. To fully utilize the depth modality, users must be aware of sensor limitations that may hinder successful application performance. Further, depth sensor devices may have accuracy problems in determining exact depth values. These problems get particularly severe at depth-map edges where large regions surrounding edges may have incorrect or missing depth values. As depth-map edges are precisely the regions where depth-based segmentation operates, resulting segmentations tend to have erroneous boundaries.

Some approaches combine sophisticated classical segmentation approaches, e.g., "graph-cut", with depth-sensors and with background subtraction to generate more sophisticated segmentation. However, benefits are limited as these approaches may be computationally complex, which may be problematic for mobile application profiles, and they may further fail to improve segmentation boundaries when such boundaries correspond to slow color variations.

A schematic diagram of an embodiment of a general telepresence architecture 100 is presented in FIG. 1. The telepresence architecture 100 may employ a client-server model comprising n terminals 110-140, where n is an integer greater than 1, connected to a server 150 via a network 160. The terminals 110-140 may each have at least one user, for a total of at least n different users. The terminals 110-140 may be configured to capture video frames, digitize the frames, and transmit digital video signals over the network 160 to the server 150. It should be noted that, although the present disclosure focuses mainly on video signals, audio and/or other supplemental signals may also be recorded, processed and transmitted in the telepresence architecture 100, in addition to or in conjunction with video signals in order to facilitate telepresence. The server 150 may be configured to receive digital video signals from each of the n terminals, process the video signals, and then transmit a video signal that may be some conversion of the n input signals back to each of the n terminals 110-140. The network 160 may be any combination of routers and other processing equipment necessary to transmit video signals between each of n terminals 110-140 and the server 150. The network 160 may, for example, be the public Internet or a local Ethernet network. The terminals 110-140 may be connected to the network 160 via wired or wireless links.

Figure 2:
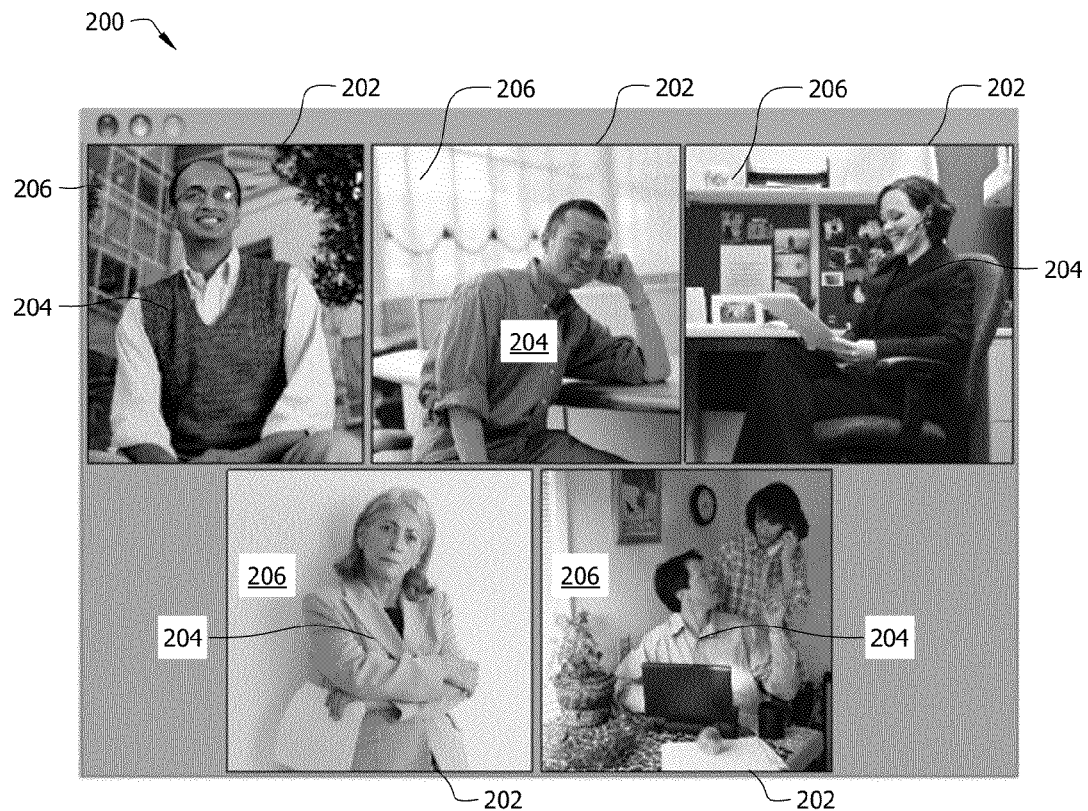
FIG. 2 is an image of an exemplary set of video frames displayed in a video conference

FIG. 2 is an image of an exemplary set of video frames displayed in a video conference 200 as may be utilized in connection with a telepresence architecture, e.g., the telepresence architecture 100 of FIG. 1, as displayed at a terminal, e.g., terminals 110-140 of FIG. 1. Each video frame 202 may originate at a terminal, e.g., via a webcam, and may have a foreground component 204, e.g., a human subject, and a background component 206, e.g., an office.

Figure 3:
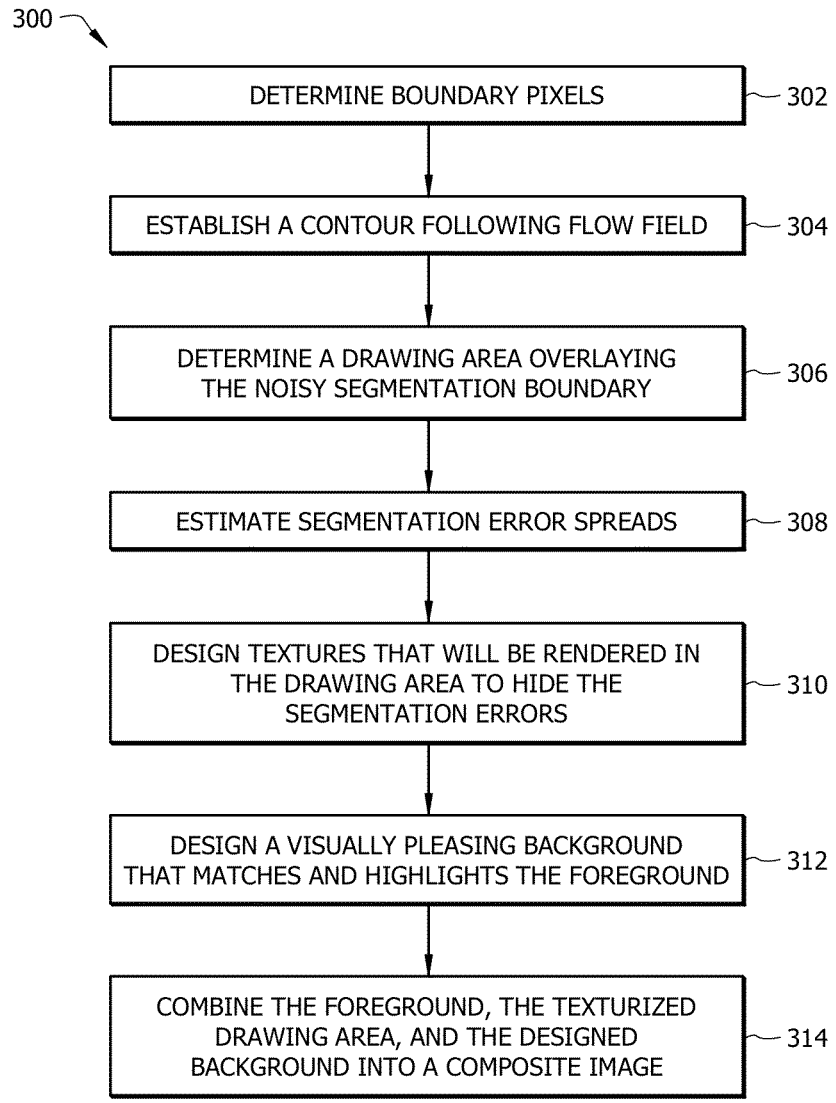
FIG. 3 is a flowchart of an embodiment of a method for visual conditioning for augmented-reality assisted video conferencing.

FIG. 3 is a flowchart of an embodiment of a method 300 for visual conditioning for augmented-reality assisted video conferencing. Method 300 begins at block 302 with determining the boundary pixels of the foreground, e.g., foreground component 204 of FIG. 2. Boundary determination is described further below in connection with FIG. 4. Once the boundary is determined, the associated contour following flow field may be established at block 304 by fixing a rectangular neighborhood around each boundary pixel. Neighborhoods of other types and/or geometries, e.g., square neighborhoods, circular neighborhoods, etc., may alternately or optionally be used. The boundary set of pixels may be established with the aid of a predefined boundary connectedness neighborhood, e.g., a four-connected or eight-connected neighborhood. Boundary pixel neighborhoods are discussed further below in connection with FIG. 7. Establishing the contour following flow field may further include fitting boundary pixel neighborhoods, that is, the resulting subset of boundary pixels, to parameterize the noisy segmentation boundary at block 306, e.g., using smoothing functions as described further below in connection with FIG. 4. At block 308, method 300 may determine a drawing area that may overlay the noisy segmentation boundary. The drawing area may be the area around the noisy segmentation boundary where the true boundary is likely to be, and may be considered as an error tolerance region enveloping the estimated boundary. To establish the drawing area, method 300 may estimate the segmentation error spreads as described further below in connection with FIG. 5. In some embodiments, e.g., the embodiment depicted in FIG. 5, it may be preferable to switch the execution order of blocks 306 and 308. Alternately, in some embodiments estimates of error spreads over each boundary pixel may be computed during the segmentation stage and communicated to the rendering stage. At block 310, method 300 may obtain and/or design textures that may be rendered in the drawing area to mask, shield, obfuscate, and/or hide the segmentation errors. Textures may be random, semi-random, or patterned fields obtained by filtering independent and/or identically distributed random processes with directional filters, e.g., the derived textures may be directional moving average processes, and may be selected from predefined look-up tables. Utilizing the contour following flow field, the drawing area, and the estimated segmentation error spreads, textures may optionally be designed to more closely match the local structure of the foreground image if the expense of additional computational complexity so merits. Designing and/or obtaining textures is discussed further below in connection with FIGS. 6B-7C. At block 312, a visually pleasing background that matches and highlights the foreground may be selected, e.g., by choosing a background from a multiplicity of backgrounds with known features or by designing a background based on the characteristics of the foreground. Visually pleasing color combinations may include harmonized, matching colors as known to those of skill in art and graphic design. In one embodiment, a base background picture is assigned a color value to compliment the assigned color value of the foreground picture. These and other manners of designing visually pleasing backgrounds that match and highlight foregrounds are discussed further below in connection with FIG. 4. At block 314, the foreground, the texturized drawing area, and the designed background are combined to obtain a final composite image. This may be done as discussed further below in connection with FIG. 4.

Figure 4:
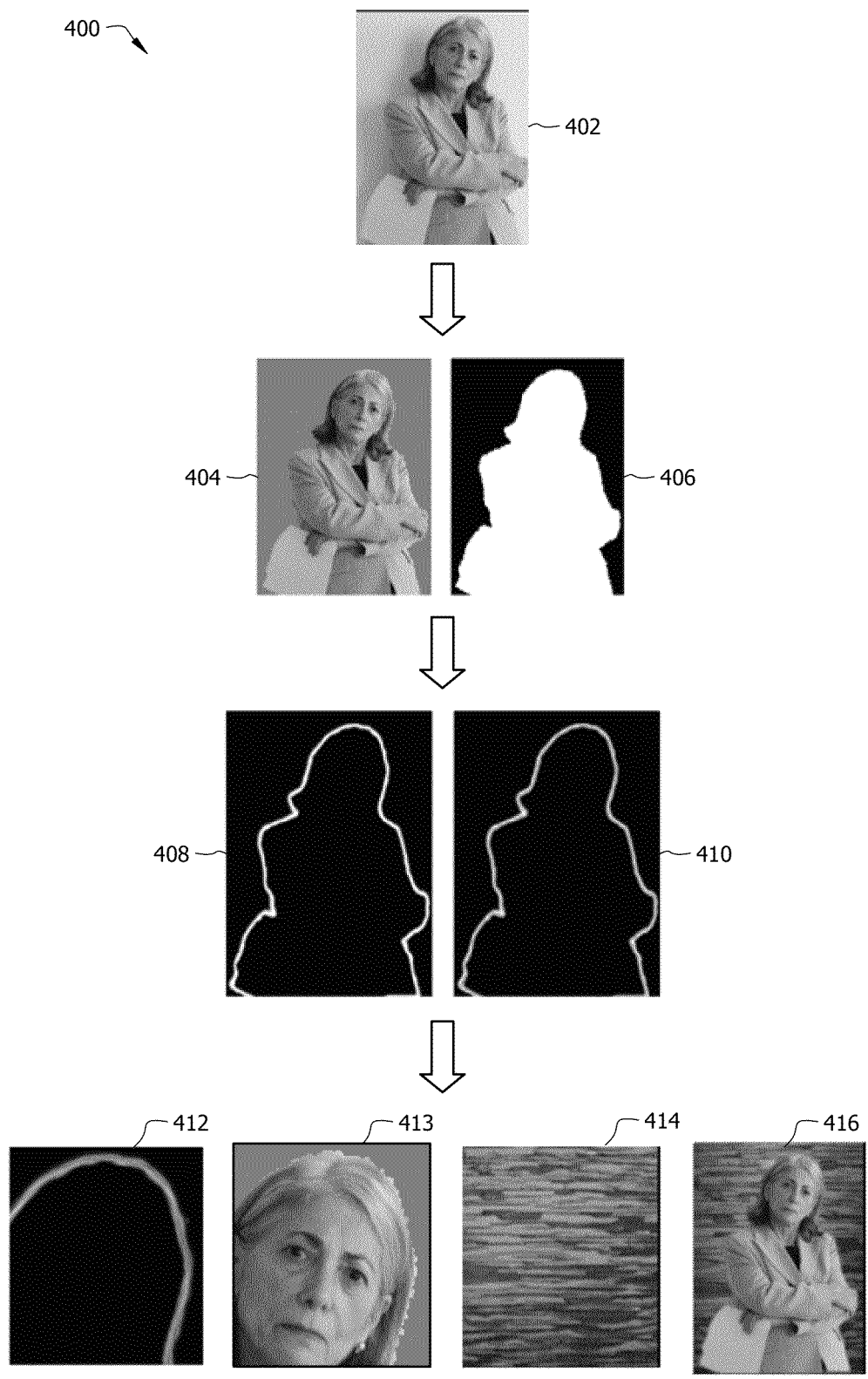
FIG. 4 is a depiction of an embodiment of a video conferencing image boundary determination process.

FIG. 4 is a depiction of an embodiment for visual conditioning for augmented-reality assisted video conferencing. In FIG. 4, process 400 may begin with segregating an initial video conferencing image 402, v(x), into a foreground 404, defined over pixels {x|s(x)=1}., and a background 406, defined over pixels {x|s(x)=0}., e.g., as described in block 302 of FIG. 3. A drawing area 408 is derived, e.g., the drawing area of block 308 of FIG. 3, and then a boundary area 410, shown superimposed over the drawing area. Next, a design texture 412 is developed, e.g., the design texture of block 310 of FIG. 3, a detailed view of the segmented foreground 404 is shown for illustrative reasons in 413, a complimentary background 414 is identified, e.g., the background of block 312 of FIG. 3, and a composite image 416 is produced, e.g., the composite image of block 314 of FIG. 3.

Process 400 may establish the boundary of foreground 404 by analyzing the video conferencing image using a predefined boundary connectedness neighborhood, i.e., a pixel region, $N_x$, surrounding a pixel, x, e.g., a four-connected or eight-connected neighborhood. A pixel, x, may be considered a boundary pixel if the binary segmentation, s(x), equals one, and at least one pixel in its boundary connectedness neighborhood, $N_x$, satisfies, s(y)=0, where y∈$N_x$. Binary segmentation refers to the operation of devising a threshold for light intensity composed of only two values, 0 and 1. The set of pixels that comprises the boundary may be referred to herein as {x|δ(x)=1}. The set of pixels that are not part of the boundary are {x|δ(x)=0}. Once the boundary δ(x) is determined, establishing the associated contour following flow field, θ(x), may begin by fixing a rectangular neighborhood around each pixel, $η_x$, and considering the part of the boundary within that neighborhood, $δ|_{η_x}$={y∈$η_x$|δ(y)=1}. Next, the resulting subset of boundary pixels may be fitted to a parametric smoothing function to yield the contour following flow field, θ(x), e.g., θ(x)=argmax$_φ$L ($δ|_{η_x}$, φ), where L (.,φ) is a linear fit to the boundary with a line having slope φ, 0≤φ≤π. For cases where $δ|_{η_x}$ results in the empty set, θ(x) may be set to an indicator value or may be extrapolated from nearby pixels with computed parameter values. A linear smoothing function may be used to obtain a best line fit to $δ|_{N_x}$ with θ(x) determining the slope of the line. Alternatively, higher order polynomials may be used to obtain a best line fit, as well as other basis functions. While this embodiment describes computing boundary subsets and associated fits at every pixel, in alternate embodiments these computations may be performed only at boundary pixels and extrapolated to the entire image domain. Additionally, the computations required during the fitting stage may be delegated to look-up tables (LUTs), for example, using the techniques known in the art.

Returning to FIG. 4, process 400 may determine a drawing area 408, ρ(x), that may overlay the noisy segmentation boundary, e.g., as described in block 308 if FIG. 3. The drawing area 408, ρ(x), may be established around the boundary δ(x) with the aid of the contour following flow field θ(x) and estimates of segmentation error spreads, a, e.g., in the direction θ(x) and in the direction orthogonal to θ(x), as contained in a vector ε(x). Consequently, determining a drawing area 408 may begin with estimating segmentation error spreads, e.g., the spread toward the foreground, $σ_x^F$, the spread toward the background, $σ_x^B$, and the spread in the direction of the contour following flow field, $σ_{θ(x)}$. Having two estimates orthogonal to θ(x) allows the analysis to accommodate non-symmetric error spreads, which may be common when depth sensors image the boundaries between materials with different properties. The foreground and background error spreads may be collected in a vector ε(x)=[$λ_x^F$ $σ_{θ(x)}$ $σ_x^F$ $σ_x^B$], where $λ_x^F$ is a 2-D unit vector in the foreground direction as defined below.

Figure 5:
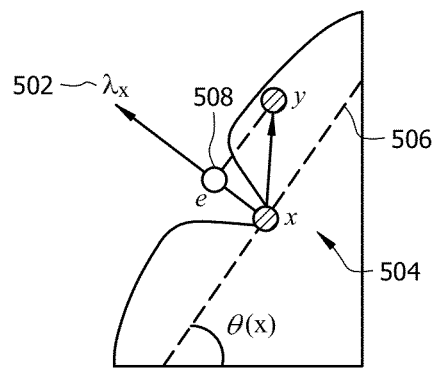
FIG. 5 is a depiction of segmentation error spreads estimated over boundary pixels.

In order for process 400 to determine the drawing area 408, process 400 may first identify the segmentation error spreads. The error spreads may be signaled to the rendering end for use in determining a drawing area, e.g., drawing area 408 of FIG. 4. When such error estimates are impractical or unavailable and/or when some performance loss is acceptable, fixed values appropriate for a given class of images may be used for the segmentation error estimates. Such fixed values may be further modified to regain some of the lost performance by using the estimation procedure depicted in FIG. 5. FIG. 5 depicts segmentation error spreads estimated over the boundary pixel x, e.g., during the drawing area determination stage. FIG. 5 shows a unit vector 502, $λ_x$, orthogonal to θ(x). $λ_x$ may point toward the foreground or toward the background. The point 504, x, may represent a pixel on the boundary. The point 506, y, may represent a pixel on the segmented object boundary or within the segmented object. The unit vector in the foreground direction may be defined as follows:

$$λ_x^F = \begin{cases} λ_x & \sum_{\{y|y∈θ_x, s(y)=1\}} (y-x)^T λ_x ≥ 0 \\ -λ_x & \text{otherwise} \end{cases}$$

where $θ_x$ denotes a rectangular neighborhood around x, and where T represents transpose. As stated above, other neighborhood types and/or geometries may alternately be used. The unit vector in the background direction may be set as follows: $λ_x^B=-λ_x^F$. The distance from point 504 to a corrected point 508, e, may be expressed as $(y-x)^T λ_x^B$. The drawing area may be obtained by the following equation:

$$ρ(x) = \frac{1}{C} \sum_{\{r|δ(r)=1\}} u(x-r, θ(r), ε(r))$$

where 0≤1 u(., ., .)≤1 is an uncertainty kernel, where the summation index, r, is such that only points on the boundary are summed, and where C is a constant that ensures ρ(x)≤1. For example:

$$C = \max_x \sum_{\{r|δ(r)=1\}} u(x-r, θ(r), ε(r)).$$

A simple oriented Gaussian function may be used for the uncertainty kernel u, e.g., for given directions and spreads the following may apply:

$$u(x, \varphi, \varepsilon) = \begin{cases} \dfrac{1}{C^F} F(r_{x,\varphi}, \sigma_\varphi, \sigma^F), & r_{x,\varphi}^T \lambda_x^F \geq 0 \\ \dfrac{1}{C^B} F(r_{x,\varphi}, \sigma_\varphi, \sigma^B), & \text{otherwise} \end{cases}$$

where F is the Gaussian kernel, $$F(r_{x,\varphi}, \sigma_\varphi, \sigma^F) = \frac{1}{\sqrt{2\pi}\,\sigma_\varphi \sigma^F} e^{-\left(\frac{r_{x,\varphi}(1)^2}{2\sigma_\varphi^2} + \frac{r_{x,\varphi}(2)^2}{2\sigma^{F2}}\right)},$$

where $\sigma^F$ is a fixed foreground constant, where $\sigma^B$ is a fixed background constant, where $$r_{x,\varphi} = \begin{bmatrix} \cos(\varphi) & \sin(\varphi) \\ -\sin(\varphi) & \cos(\varphi) \end{bmatrix} x,$$

and where $C^F$, $C^B > 0$ are constants chosen to ensure the smooth transition of the uncertainty kernel from its foreground to its background portions e.g., $C^F = \sqrt{2\pi}\sigma^F \sigma_\varphi$, $C^B = \sqrt{2\pi}\sigma^B \sigma_\varphi$. Other functions may optionally or alternately be utilized as known in the art. In alternate embodiments, the uncertainty kernel may be pre-computed and stored in a look-up-table that is accessed online to establish the drawing region.

The spread toward the background, $\sigma_x^B$, may be estimated by adding the fixed background constant, $\sigma^B$, to a constant, $d^B$, multiplied by a correction value, $\kappa_x^B$. The correction $\kappa_x^B$ may be computed with the portion of the foreground that overlaps the local background, as established through a linear approximation to the boundary. Higher order approximations may optionally or alternatively be used. Thus, the spread toward the background may be expressed as follows: $\sigma_x^B = \sigma^B \kappa_x^B$, where $d^B \geq 0$, e.g., 1, 1.2, 1.5, 2.1, etc., and where $$\kappa_x^B = \left(\frac{\sum_{\{y|y \in \vartheta_x, s(y)=1, (y-x)^T \lambda_x^B \geq 0\}} |(y-x)^T \lambda_x^B|^q}{\sum_{\{y|y \in \vartheta_x, s(y)=1, (y-x)^T \lambda_x^B \geq 0\}} 1}\right)^{1/q}$$

where q=1, but other q≥0 values may optionally be used, e.g., q=2, 0.5, 1.5, 1.7102, etc. The spread toward the foreground, $\sigma_x^F$, may be estimated in substantially the same way, namely, $\sigma_x^F = \sigma^F + d^F \kappa_x^F$, where $d^F$ is a positive number constant and where $$\kappa_x^F = \left(\frac{\sum_{\{y|y \in \vartheta_x, s(y)=0, (y-x)^T \lambda_x^F \geq 0\}} |(y-x)^T \lambda_x^F|^q}{\sum_{\{y|y \in \vartheta_x, s(y)=0, (y-x)^T \lambda_x^F \geq 0\}} 1}\right)^{1/q}.$$

As with the spread toward the background, higher order approximations may optionally or alternatively be used. Here, q=1, but other q≥0 values may optionally be used. The spread in the direction of the contour following flow field, $\sigma_{\theta(x)}$, may be fixed to a nonzero positive value, 0.5, 0.9, 2.0 at a particular video resolution (e.g., 640×480) and may be linearly scaled to accommodate other resolutions (e.g., twice the value at 1280×960). The spread in the direction of the contour following flow field, $\sigma_{\theta(x)}$, may also be adjusted in like manner based on the local variation of the contour following flow field.

Figure 6A:
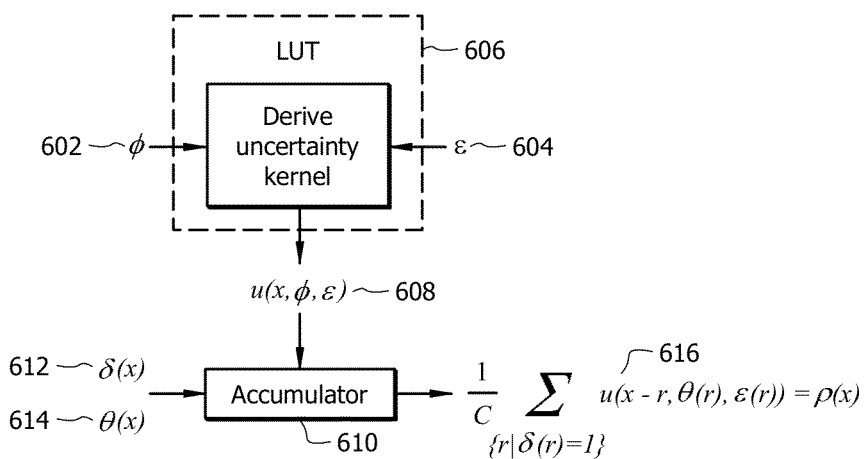
FIG. 6A is a visual representation of an embodiment of the process of deriving a drawing region.

FIG. 6A shows a visual representation of an embodiment of the process of deriving a drawing region, e.g., drawing area 408 of FIG. 4. A slope 602 and a vector 604 representing a foreground and background error spread may be input into a LUT 606 in order to identify an uncertainty kernel 608. The uncertainty kernel 608 may be fed into an accumulator 610 along with a boundary 612 and contour following flow field 614. The accumulator 610 may derive the drawing region using the formula 616, explained further above.

Returning to FIG. 4, process 400 may next derive directional design textures 412 for allowing a closer match to the local structure of the foreground image. Textures may be derived from the contour following flow field, and optionally with the aid of further parameters, such as local directional correlations, etc., obtained from the foreground image. Adding further parameters may allow the designed textures to more closely match the local structure of the foreground image at the expense of additional computational complexity. In some embodiments, textures may be derived as random fields and obtained by filtering independent and identically distributed random processes with directional filters, e.g., the derived textures may be directional moving average processes. More sophisticated random processes, such as auto-regressive moving average processes, and texture-resampling techniques may optionally or alternatively be used. Oriented Gaussian functions, e.g., $$F(r_{x,\varphi}, \sigma_h, \sigma_v) = \frac{1}{\sqrt{2\pi}\,\sigma_h \sigma_v} e^{-\left(\frac{r_{x,\varphi}(1)^2}{2\sigma_h^2} + \frac{r_{x,\varphi}(2)^2}{2\sigma_v^2}\right)}$$

where $$r_{x,\varphi} = \begin{bmatrix} \cos(\varphi) & \sin(\varphi) \\ -\sin(\varphi) & \cos(\varphi) \end{bmatrix} x,$$

may be used as the moving average filters, where orientation is determined with respect to $\theta(x)$. The remaining two parameters, $\sigma_h, \sigma_v$, which is to say, the standard deviations that control filter bandwidth in the direction $\theta(x)$ and in the direction orthogonal to $\theta(x)$, required to completely specify the Gaussian filter, may be set to fixed values or may be varied per-pixel using the above-mentioned directional correlations measured from the foreground image.

Design textures 412, $\psi_{\varphi,\sigma_h,\sigma_v}(x)$, may be computed offline and added to a LUT that stores the random field realizations indexed by various parameters, e.g., direction, contour following flow field, standard deviations, directional correlations obtained from foregrounds, etc. The LUT may utilize three texture parameters or variables for looking up textures, e.g., direction, line segment length, and line segment thickness. Each design texture 412 realization may be scaled and shifted in value such that $1 \geq \psi_{\varphi,\sigma_h,\sigma_v}(x) \geq 0$. These realizations may be sampled on-line by consulting the LUT with the required parameters obtained for the particular pixel using a neighborhood, $\mu_x$, to result in the texture value, $\alpha(x)$, described further below under FIG. 7C.

The φ-oriented design texture field realization may be obtained as follows:

$$\psi_{\varphi,\sigma_h,\sigma_v}(x) \equiv \sum_y R(x-y) F(r_{y,\varphi}, \sigma_h, \sigma_v)$$

where R(.) is an independent identically distributed (i.i.d.) Gaussian process of zero-mean and unit variance, and where $$r_{y,\varphi} = \begin{bmatrix} \cos(\varphi) & \sin(\varphi) \\ -\sin(\varphi) & \cos(\varphi) \end{bmatrix} y.$$

Figure 6B:
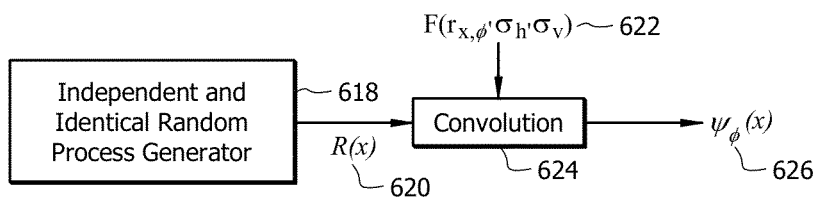
FIG. 6B is a visual representation of an embodiment of the process of deriving a texture field.

Textures may be derived as simple moving average processes, which processes may generate suitable contour-hatching depictions. By analogy, if the texture depictions are thought of as pictures generated by pencil strokes on paper, the parameter φ may control the direction of the pencil strokes, $\sigma_h$ may control the typical length of pencil strokes, and $\sigma_v$ may control the typical thickness of pencil strokes. Other embodiments may utilize general autoregressive-moving-average (ARMA) processes and/or more sophisticated approaches such as wavelet-based texture generation techniques. The textures resulting from the contour following flow field may be similar to contour hatching drawing patterns. When the textures are rendered in the drawing area to form the final composite, $c_f(x)$, they may allow a generally or approximately seamless extension of texture-like areas in the foreground into the background. FIG. 6B shows a visual representation of an embodiment of the process of deriving a texture field. An independent and identical random process generator 618 feeds values to an i.i.d. Gaussian process of zero-mean and unit variance, R(x) 620. A second Gaussian process, oriented Gaussian function $F(r_{x,\varphi},\sigma_h,\sigma_v)$ 622, produces the φ-oriented design texture field, $\psi_{\varphi,\sigma_h,\sigma_v}(x)$ 626, through a convolution 624 of the two Gaussian functions R(x) 620 and $F(r_{x,\varphi},\sigma_h,\sigma_v)$ 622.

Figure 7A:
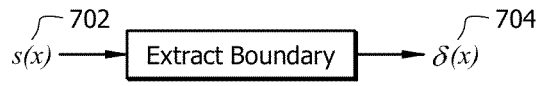
FIG. 7A is a visual representation of an embodiment of the process of deriving a generalized boundary area from a foreground image.
Figure 7B:
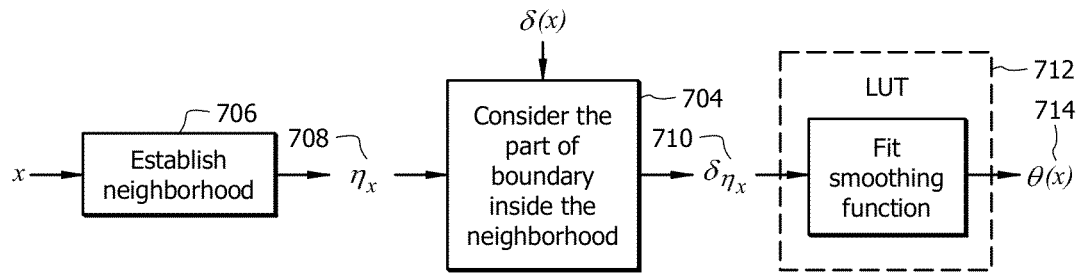
FIG. 7B is a visual representation of an embodiment of the process of deriving a contour following flow field for a given pixel.
Figure 7C:
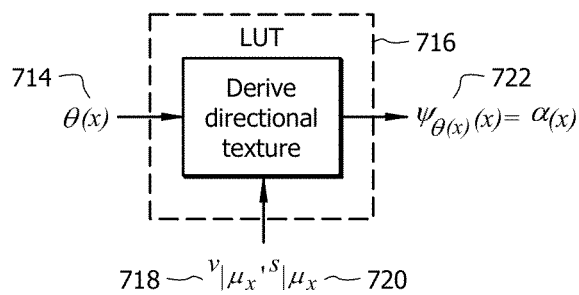
FIG. 7C is a visual representation of an embodiment of the process of deriving per-pixel directions and associated directional textures that follow the foreground contour.

FIG. 7A shows a visual representation of an embodiment of the process of deriving a generalized boundary area from a foreground image. A foreground 702, e.g., foreground 402 of FIG. 4, may be analyzed to extract a generalized boundary area 704, e.g., boundary 410 of FIG. 4. FIG. 7B shows a visual representation of an embodiment of the process of deriving a contour following flow field 714, e.g., contour following flow field 614 of FIG. 6, for a given pixel, x, along a boundary. A pixel 706 may be combined with a predefined pixel neighborhood to create a localized boundary pixel neighborhood 708. The generalized boundary area 704 may be considered at the localized boundary pixel neighborhood 708 to produce a localized boundary pixel neighborhood 710. At LUT 712, a linear smoothing function may be applied to the localized boundary pixel neighborhood 710 to produce a contour following flow field 714, e.g., contour following flow field 614 of FIG. 6. FIG. 7C shows a visual representation of an embodiment of the process of deriving per-pixel directions and associated directional textures that follow the foreground contour, e.g., the design textures 412 of FIG. 4. At LUT 716, the contour following flow field 714 may be combined with the localized foreground 718 and the localized video conferencing image 720 to produce a 0-oriented design texture field 722, i.e., the desired design texture.

The process 400 may design a visually pleasing background 414 for the augmented-reality-assisted video conferencing. It is well known in art and graphic design that human observers prefer certain color combinations to others. Researchers have tried to quantify matching colors, e.g., harmonic colors, in various color spaces resulting in recommended templates that image to which histograms should conform. Consequently, process 400 may comprise designing backgrounds having a very low complexity color modulation function that modulates a base background picture's color values to match the foreground picture's color values. A dominant foreground color, $D_F$, may be selected from a color palate, e.g., a hue (H), saturation (S), and value (V) (HSV) color space, as the weighted average of foreground colors, e.g., according to the following:

$$D_F = \frac{\sum_{\{x|s(x)=1\}} w(C_v(x)) C_v(x)}{\sum_{\{x|s(x)=1\}} w(C_v(x))}$$

where $C_v(x)=[H(x)\ S(x)\ V(x)]$ is the HSV domain color vector of the foreground image v at x, and where w is the weight, which may be an average of various components, e.g., S and V components, in order to give preference to easily visible, saturated colors. Other weights and color spaces, e.g., hue, saturation, and lightness (HSL), hue, saturation, and intensity (HSI), or red, green and blue, may optionally or alternatively be used. Process 400 may next select a harmonizing color, $h_F$, that highlights the computed dominant color, $D_F$. A variety of templates may be used to select the harmonizing color, as known in the relevant art. Assuming the H channel is in radians, $h_F$ may, e.g., be computed as $h_F=D_F+[\pi,0,0]$. Once process 400 computes $h_F$, the modulation function may manipulate the base background color values by ensuring that the background dominant color is the computed harmonizing color, e.g., $D_B=h_F$. For a gray-scale base background, e.g., a base background image with pixels having only V components, modulation may be accomplished by scaling the pixel V components and assigning the harmonizing H and S components to each pixel. The dominant color of a color base background image may be computed, and the difference factor toward the harmonizing color may be calculated. The resulting difference factor may then be applied to every pixel. In some embodiments, gray-scale backgrounds formed with the aid of sampled directional textures that accomplish cross-hatching patterns may be used, e.g., by reusing the directional texture LUT to realize the textures and blending. Other embodiments may use color backgrounds obtained through a clip-art package or database. Still other embodiments may vary the background over time and/or use pre-existing video to form base background frames that may be modulated to form time varying backgrounds. These and other variations will be apparent to those of skill in the relevant art. Using the above mechanisms, process 410 thus designs a visually pleasing background b(x) 414 that is complimentary to the foreground image 404. Once b(x) is designed, the initial composite $C_i(x)=s(x)v(x)+(1-s(x))b(x)$, may be formed. The initial composite may then be modified to form the final composite. In one embodiment, a single foreground dominant color may be determined for the entire background image. This single foreground dominant color may be used to modulate the background image colors as discussed above. In another embodiment, the background image pixels may be divided into K regions, $\rho_i$ i=1, ..., K. A separate foreground dominant color may then be calculated for each region, and this foreground dominant color may be used to modulate the background image colors in that region. Regions may be individual background pixels or may be groups of pixels forming irregular or regular shapes, e.g., squares, triangles, ovals, etc. Regions may also be determined by applying object-based region decomposition algorithms on base background images. In one embodiment, the dominant foreground color for region i, e.g., the dominant foreground color $D_{F,i}$ for $\rho_i$, may be calculated as follows:

$$D_{F,i} = \frac{\sum_{\{x|s(x)=1\}} w(C_v(x), d(x, \rho_i))C_v(x)}{\sum_{\{x|s(x)=1\}} w(C_v(x), d(x, \rho_i))}$$

where $d(x, \rho_i)$ measures the distance between foreground pixel x and region $\rho_i$. In one such embodiment $d(x, \rho_i)=\min\{\|x-y\|_2 | y\in\rho_i\}$. In another such embodiment $$d(x, \rho_i) = \|x - m_i\|_2, m_i = \frac{\sum_{y\in\rho_i} y}{\sum_{y\in\rho_i} 1}.$$

The initial weight may be otherwise modified to accommodate d(.,.) as known to those of ordinary skill in the relevant art. In one embodiment, the segmentation end may determine background color hints by using the colors in the actual or initial background, e.g., in the actual scene or real world video teleconference user environment, over pixels that are close to the foreground areas. Background color hints may be defined as one or more color values and associated pixel coordinates that signal that the background color in the original scene is close to the signaled color value at the signaled pixel location. These hints may be obtained by averaging the actual background pixel colors in the actual scene over pixels that are close to the foreground areas. Once determined, these hints may be sent to the rendering end to be used in constructing the visually pleasing virtual background. When these hints are available, the rendering end may determine the virtual background colors in a way that ensures there is no substantial deviation from the sent color hints, e.g., by selecting a virtual background color which is analogous or split-analogous in color scheme to the actual background, e.g., by being adjacent on a color wheel. This may help in further avoiding artifacts.

Returning to FIG. 4, process 400 may produce a composite image 416. The final composite image may be expressed as $c_f(x)=\rho(x)\tau(x)+(1-\rho(x))c_i(x)$, where $\tau(x)=\gamma(x)v_A(x)+(1-\gamma(x))b(x)$, where $v_A(x)$ is a local average computed over a given neighborhood, and where $\gamma(x)$ is a blending factor dependent on designed textures, wherein $1\geq\gamma(x)\geq0$, discussed further below. The rendered textures may thus modulate a local average of the foreground with the given background.

Figure 8:
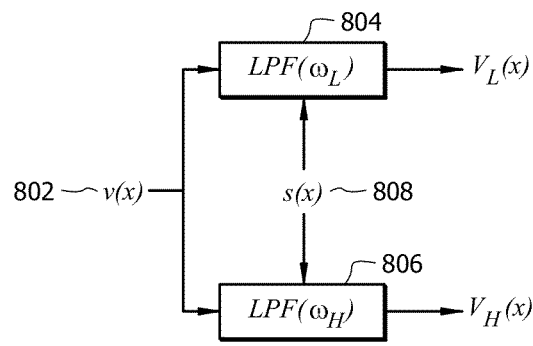
FIG. 8 is a visual representation of an embodiment of a two-pass filtering analysis.

One way for process 400 to calculate the blending factor $\gamma(x)$ is via direct use of the calculated directional textures by setting $\gamma(x)=\alpha(x)$. However, process 400 may obtain more accurate results by using a heuristic that compares different the foreground calculated at different resolutions, e.g., using spatial averages, one at a low resolution and one at a higher resolution. If the two averages agree on a pixel, then one has increased confidence that the pixel belongs to the foreground. FIG. 8 shows a visual representation of an embodiment of a two-pass filtering analysis. As shown in FIG. 8, a video conferencing image 802, e.g., the video conferencing image of FIG. 4, may be fed through two low pass filters (LPFs) 804 and 806 at different pass-band frequencies, $\omega_L$ and $\omega_H$, where $\omega_H>\omega_L$. The low pass filters may further receive the binary segmentation 808, e.g., the binary segmentation of FIG. 4, so that if desired only the foreground pixels may be filtered, and output $v_L(x)$ and $v_H(x)$ which may denote the low resolution and high resolution averages, respectively. Additionally, the values of a difference measure $\partial(v_L(x), v_H(x))$ may be calculated. These values may be such that $1\geq\partial(v_L(x), v_H(x))\geq0$, denoting a difference measure resulting in large scalars for very different inputs and smaller scalars for similar inputs, e.g., $\partial(v_L(x),v_L(x))=\partial(v_H(x),v_H(x))=0$. The blending factor may thus be expressed as $\gamma(x)=\partial(v_L(x),v_H(x))\alpha(x)+(1-\partial(v_L(x),v_H(x))c_\alpha$, where $1\geq c_\alpha\geq0$ is a constant. Thus, process 400 may combine the foreground 404, shown in detail in 413, the drawing area 410 having a designed texture 412, and the designed background 414 to create a composite image 416 that comprises a visually conditioned augmented-reality-assisted video image.

Figure 9:
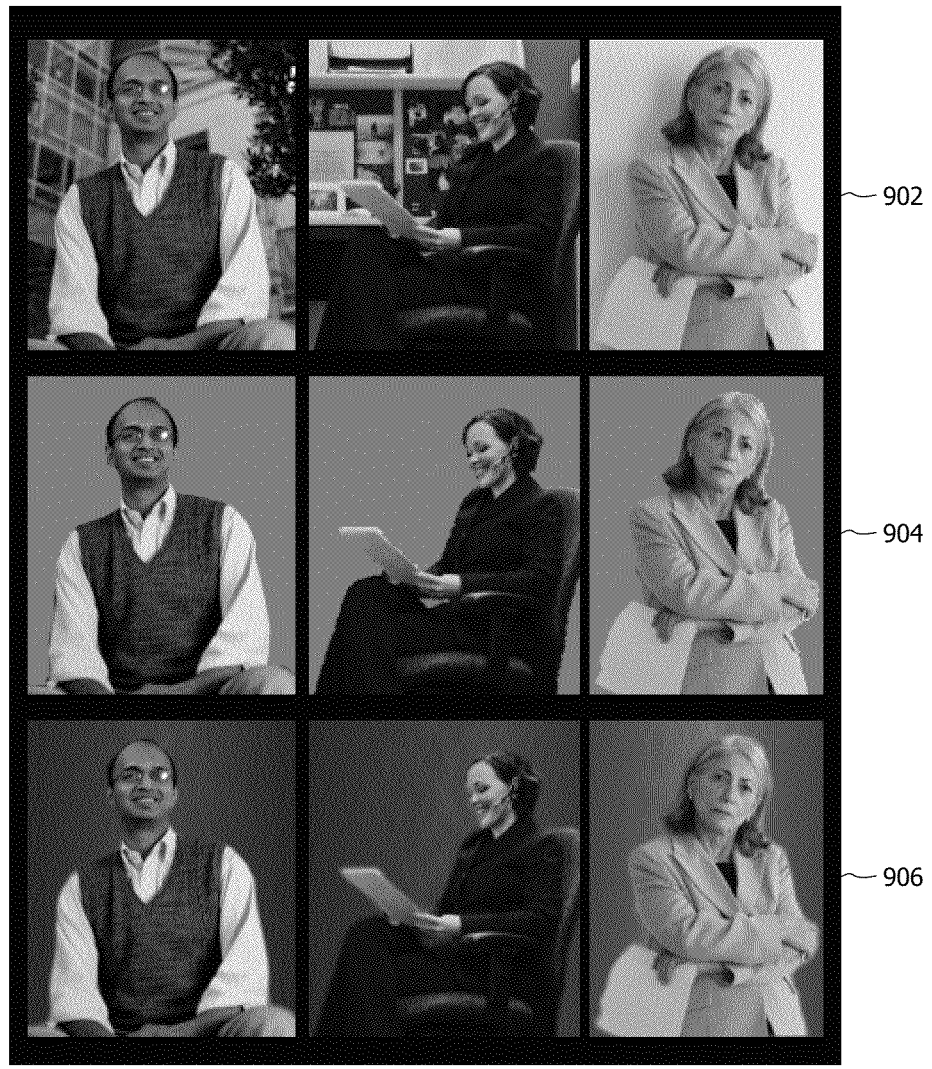
FIG. 9 is a visually conditioned augmented-reality-assisted video conferencing session having three participants.

FIG. 9 shows a visually conditioned augmented-reality-assisted video conferencing session having three participants. Row 902 shows the participants at their original locales, i.e., with native backgrounds of varying colors, shapes, and types, e.g., video conferencing images 402 of FIG. 4. Row 904 shows noisy segmentations of participant visuals forming foregrounds with segmentation artifacts, e.g., foreground 404 of FIG. 4. Row 906 shows final composite images, e.g., composite images 416 of FIG. 4, following execution of a routine for visual conditioning for augmented-reality-assisted video conferencing. Each of the final composite images may have different color backgrounds and/or textures, e.g., the backgrounds of one final composite images may be blue, the background of the second a color gradient from green to orange, the third background may be purple and include a crosshatched repeating pattern.

Figure 10:
FIG. 10 is representative visually conditioned augmented-reality-assisted video conferencing backgrounds as applied to three participants in a video conference.

FIG. 10 shows representative visually conditioned augmented-reality-assisted video conferencing backgrounds as applied to three participants in a video conference. The backgrounds, e.g., backgrounds 406 of FIG. 4, shown in column 1002 may be selected from a variety of colors to color-match to the foregrounds, e.g., foregrounds 404 of FIG. 4. The backgrounds may include color gradients and/or color palates suitable to color-match the foregrounds. The backgrounds may vary in color, pattern, and/or texture between participants in a video teleconference or may be consistently applied across participants, as shown in row 1004. Where a video conferencing image, e.g., video conferencing image 402 of FIG. 4, contains two or more persons in the foreground, the background may include a pattern, texture and/or color gradient that is suitable to the foreground participant in the immediate region. Colors, patters, or textures may be selected to aid in masking segmentation errors.

Although generally discussed herein in the context of single component processing, as will be apparent to those of skill in the art, at least some portions of the disclosed systems and methods may be accomplished at either end of a video teleconference session. For example, segmentation error spreads and color hints may be identified and communicated from the site accomplishing video capture, e.g., a server 150 of FIG. 1, to the site(s) doing the rendering, e.g., one or more terminals 110-140 of FIG. 1. Such alternate embodiments are expressly within the scope of the present disclosure.

Figure 11:
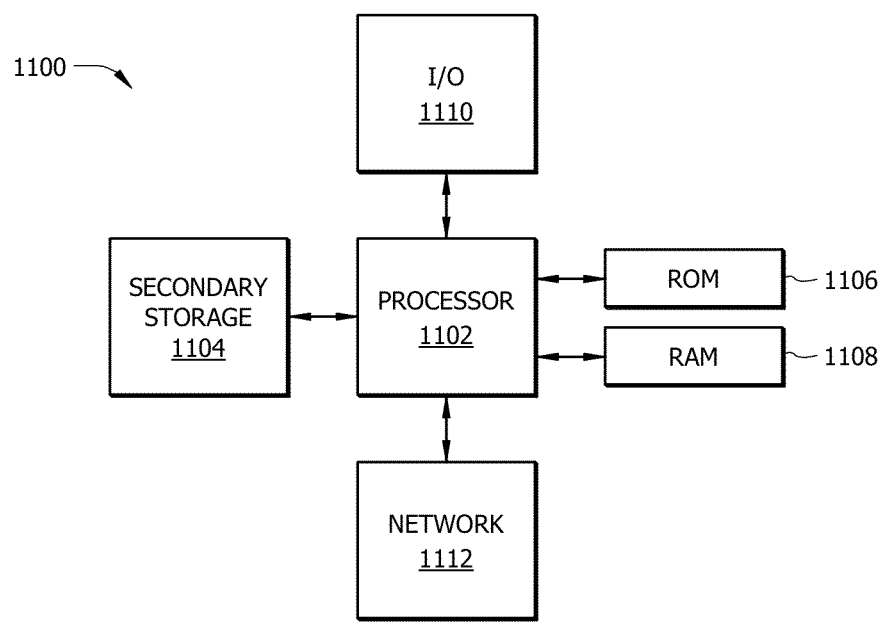
FIG. 11 illustrates a typical, general-purpose network component.

The network components described above may be implemented on any general-purpose computer component, such as a computer or network component with sufficient processing power, memory resources, and network throughput capability to handle the necessary workload placed upon it. FIG. 11 illustrates a typical, general-purpose network component 1100 suitable for implementing one or more embodiments of the components disclosed herein, e.g., terminals 110-140 or server 150 of FIG. 1. The network component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, e.g., cameras, microphones, display screens, etc., and network connectivity devices 1112. The processor 1102 may be implemented as one or more CPU chips, or may be part of one or more application specific integrated circuits (ASICs) and/or digital signal processors (DSPs).

The secondary storage 1104 is typically comprised of one or more disk drives or erasable programmable ROM (EPROM) and is used for non-volatile storage of data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of All documents described herein are incorporated herein by reference.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
    a receiver configured to receive a video teleconferencing image, wherein the video teleconferencing image comprises an original background and at least one foreground; and
    a processor coupled to the receiver, wherein the processor is configured to:
        determine an estimated boundary between the foreground and the original background, wherein the boundary comprises a plurality of pixels;
        determine a drawing area to obscure segmentation errors associated with the boundary, wherein determining the drawing area comprises:
            establishing a contour following flow field comprising a directional neighborhood around each boundary pixel to indicate directions following a contour of the boundary;
            estimating a spread of the segmentation errors in directions indicated by the contour following flow field; and
            deriving the drawing area to encompass the segmentation errors utilizing the contour following flow field and the estimated segmentation error spread;
        overlay the boundary with the drawing area; and
        replace the original background of the video teleconferencing image with a new background.

2. The apparatus of claim 1, wherein the drawing area contains one or more textures, and wherein the textures of the texturized drawing area are selected from a group consisting of: random textures, semi-random textures, patterned textures, and pattern fields selected to match a local structure of the foreground.

3. The apparatus of claim 1, wherein the processor is further configured to select the new background from a plurality of new backgrounds, and wherein the selection includes harmonizing a color of the new background with a color of the foreground.

4. The apparatus of claim 1, wherein the processor is further configured to:
    receive a second video teleconferencing image, wherein the second video teleconferencing image comprises an original background and a foreground;
    determine an estimated boundary between the original background and the foreground of the second video teleconferencing image;
    determine a drawing area of the second video teleconferencing image to obscure segmentation errors associated with the boundary of the second video teleconferencing image;
    overlay the boundary of the second video teleconferencing image with the drawing area, wherein the drawing area of the second video teleconferencing image obscures the boundary of the second video teleconferencing image; and replace the original background of the second video teleconferencing image with a new background, wherein the new background of the second video teleconferencing image is distinct from the new background of the video teleconferencing image in color, texture, or both.

5. The apparatus of claim 1, wherein the processor is further configured to select the new background from a plurality of new backgrounds, and wherein the selection includes selecting a texture to facilitate a smooth visual transition from the foreground to the new background.

6. The apparatus of claim 1, wherein the contour following flow field is a linear fit to the boundary, and wherein the segmentation error spread is estimated in both a direction of the contour following flow field at each boundary pixel and a direction orthogonal to the contour following flow field at each boundary pixel.

7. The apparatus of claim 1, wherein the processor is further configured to:
select at least one dominant foreground color from the foreground; and
select the new background by determining that the new background comprises at least one dominant background color matching the dominant foreground color.

8. The apparatus of claim 7, wherein selecting the dominant foreground color is accomplished by passing at least a portion of the video teleconferencing image through a first and second low pass filter, and wherein the first low pass filter has a lower pass band frequency than the second low pass filter.

9. The apparatus of claim 7, wherein the processor is further configured to modulate the new background over time to form a time varying background.

10. The apparatus of claim 9, wherein the modulation is accomplished using base background frames formed from pre-existing video.

11. The apparatus of claim 7, wherein the foreground comprises two dominant foreground colors, wherein the new background comprises two dominant background colors, and wherein the first dominant background color matches the first dominant foreground color and the second dominant background color matches the second dominant foreground color.

12. The apparatus of claim 1, wherein the processor is further configured to:
design one or more textures to be rendered in the drawing area;
select the new background; and
combine the foreground, the one or more textures, the drawing area, and the new background to form a composite image.

13. The apparatus of claim 12, wherein selecting the new background comprises:
averaging pixel colors in the original background to obtain an average original background color; and
determining a color of the new background based on the average original background color, wherein the color of the new background is analogous or split-analogous in color scheme to the average original background color.

14. The apparatus of claim 12, wherein designing one or more textures comprises approximating a local structure of the foreground using textures designed using one or more techniques selected from a group consisting of: random field generation, semi-random field generation, patterned field generation, auto-regressive moving average processes, and texture-resampling processes.

15. A method implemented in a network element, the method comprising:
receiving a video teleconferencing image, wherein the video teleconferencing image comprises an original background and at least one foreground;
determining an estimated boundary between the foreground and the original background, wherein the boundary comprises a plurality of pixels;
determining a drawing area to obscure segmentation errors associated with the boundary, wherein determining the drawing area comprises:
establishing a contour following flow field comprising a directional neighborhood around each boundary pixel to indicate directions following a contour of the boundary;
estimating a spread of the segmentation errors in directions indicated by the contour following flow field; and
deriving the drawing area to encompass the segmentation errors utilizing the contour following flow field and the estimated segmentation error spread;
overlaying the boundary with the drawing area; and
replacing the original background of the image with a new background.

16. The method of claim 15, further comprising selecting the new background from a plurality of new backgrounds, wherein the selection includes harmonizing a color of the new background with a color of the foreground.

17. The method of claim 15, wherein the contour following flow field is a linear fit to the boundary, and wherein the segmentation error spread is estimated in both a direction of the contour following flow field at each boundary pixel and a direction orthogonal to the contour following flow field at each boundary pixel.

18. The method of claim 15, further comprising:
selecting at least one dominant foreground color from the foreground; and
select the new background by determining that the new background comprises at least one dominant background color matching the dominant foreground color.

19. The method of claim 18, wherein selecting the dominant foreground color is accomplished by passing at least a portion of the video teleconferencing image through a first and second low pass filter, and wherein the first low pass filter has a lower pass band frequency than the second low pass filter.

20. The method of claim 15, further comprising selecting the new background by:
averaging pixel colors in the original background to obtain an average original background color; and
determining a color of the new background based on the average original background color,
wherein the color of the new background is analogous or split-analogous in color scheme to the average original background color.

* * * * *